United States Patent Office 3,302,288
Patented Feb. 7, 1967

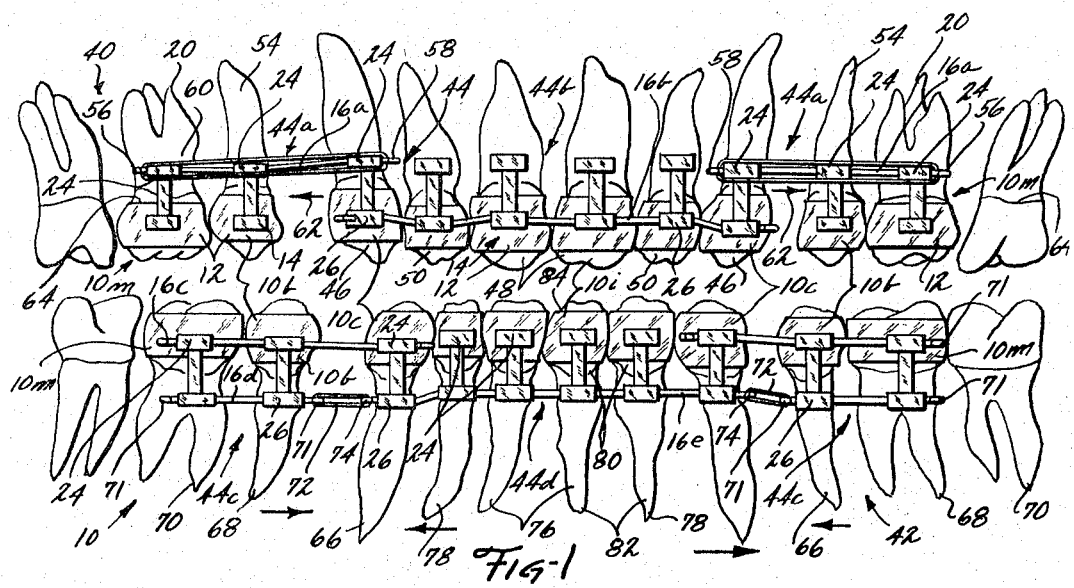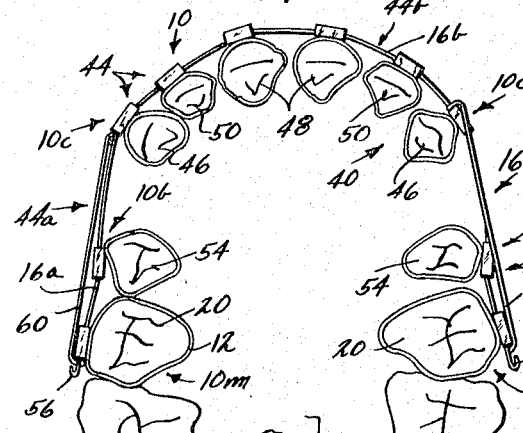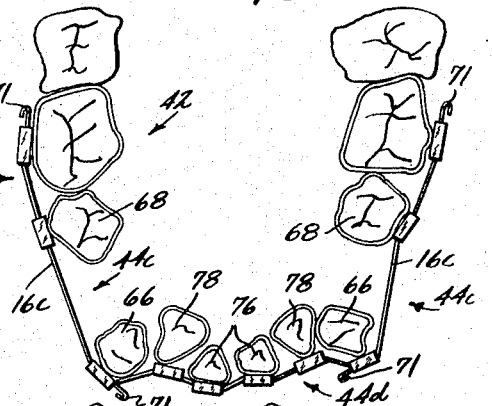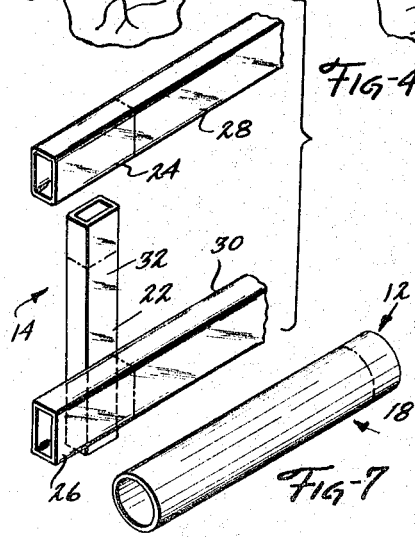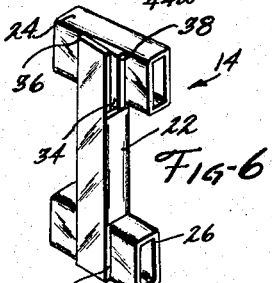

3,302,288
ORTHODONTIC APPLIANCES
Harry W. Tepper, 11633 San Vicente Blvd.,
Los Angeles, Calif. 90049
Filed June 4, 1964. Ser. No. 372,639
3 Claims. (Cl. 32—14)

This invention relates to new and useful orthodontic appliances, and more particularly to orthodontic appliance means for correcting and finishing the alignment and positioning of teeth while minimizing the amount of orthodontic mechanotherapy involved.

For years, orthodontic appliance therapy has included the use of metal bands to which a number of different types of brackets are affixed, depending upon the type of orthodontic force to be applied to a particular tooth. These metal bands are comparatively expensive because they are usually engineered to quite exacting specifications. Although such bands are usually precontoured to fit as closely as possible to the tooth anatomy, an orthodontist must still spend considerable time shaping each metal band to a particular tooth. This, of course, adds considerably to the cost of successful orthodontic appliance therapy.

A particular patient's dental arch may be too small to accommodate all of his permanent teeth. In such cases, it may be desirable to extract certain teeth, leaving a void which can be closed by shifting the patient's remaining teeth. A tooth is usually shifted by affixing a hook to a metal band encompassing the tooth to be shifted, and then applying a force to the hook to shift the tooth. This tooth-shifting force is applied usually below the gum line nearer the crown or biting edge of the tooth than its apex or tip of its root. Since the tooth is anchored by its root which extends considerably up into the gum line, a force applied near the crown creates a moment causing the lower end of the tooth to shift while the upper end of the root acts as a stationary pivot point. Thus, the tooth being moved does not remain vertical and in parallel alignment with the occlusial plane.

Some prior art orthodontic appliances include continuous orthodontic arch wires. One arch wire may be employed on the patient's upper dental arch and extend from the posterior teeth on one side of the arch to the posterior teeth on the other side of the arch with the patient's anterior teeth being connected thereto. A similar arrangmentment may then be employed in connection with the patient's lower dental arch. Such continuous arch wires have the disadvantage that, when a patient occludes vertically, undesirable stresses are transferred from one side of the patient's dental arch to the other, resulting in forces being applied to the teeth in directions which may be opposite to that being imparted thereto by the particular arch wire when it functions as it should. Another disadvantage with the continuous arch wire resides in the fact that it is sometimes quite difficult to readily change the force-applying means employed therewith.

Certain orthodontic appliance therapy techniques dictate progressive steps extending over a considerable period of time for correcting and finishing the alignment and positioning of the teeth in a particular dental arch. It is sometimes necessary to employ one set of orthodontic appliances to move certain teeth into a void or empty space, after which another set of orthodontic appliances may be used to correct particular aspects of malocclusion or the like. It is then necessary to use yet a third set of orthodontic appliances to finish the alignment and positioning of the teeth in both dental arches. Thus, the treatment extends over a considerable span of time, resulting in a comparatively high cost to the patient.

Other prior art orthodontic appliances are designed in such a manner that it is quite difficult to change the forces applied to particular teeth in a dental arch because the force-applying means is so complicated.

In view of the foregoing factors and conditions characteristic of means employed in orthodontic appliance therapy, it is a primary object of the present invention to provide new and useful means for orthodontic therapy not subject to the disadvantages enumerated above and employing a minimum number of individual orthodontic appliances especially designed for use in a maximum number of orthodontic procedures efficiently, safely, and expeditiously.

Another object of the present invention is to provide a new and useful orthodontic band material which may be supplied in continuous lengths of tubing from which an orthodontist can sever individual bands, each of which may be applied to a tooth of a patient in a minimum amount of time without the necessity of painstakingly shaping the band to the anatomy of the tooth.

Yet another object of the present invention is to supply orthodontic brackets in extruded lengths which may be cut to size by the individual orthodontist and applied to a band of the present invention rapidly and efficiently.

Still another object of the present invention is to provide a new and useful orthodontic arch having a segmental construction designed in such a manner that stresses will be dissipated in a horizontal direction when a patient occludes vertically.

A further object of the present invention is to provide a set of orthodontic appliances especially designed to apply tooth-shifting forces from a point above the patient's gum line in such a manner that a tooth will remain in parallel alignment to the occlusial plane as it is being shifted.

A still further object of the present invention is to provide a new and useful set of orthodontic applicances designed in such a manner that it is relatively simple to change forces being applied to a particular dental arch and which facilitates changing the force-applying means.

Another object of the present invention is to provide a new and useful orthodontic appliance which controls tooth torquing in several directions.

Yet another object of the present invention is to provide a new and useful set of orthodontic appliances especially designed to apply a minimum of force to shift a tooth rapidly without causing the tissue surrounding the tooth to react against the shifting.

According to one aspect of the present invention, orthodontic bands are supplied in continuous tubular lengths from which individual bands may be severed. The bands preferably are made from a material which is supplied in a stretched condition so that the band may be placed around a tooth and then shrunk to the particular anatomy of the tooth.

According to another aspect of the present invention, a new and useful dental bracket is provided which is especially designed so that posterior teeth can be shifted by applying a force above the gum line while, simultaneously, torquing of anterior teeth can be controlled in several directions. The bracket is generally I-shaped with the upper and lower crossbars of the T being hollow and preferably having a noncircular cross-section. The lower crossbar is affixed to the band and the upper crossbar is positioned adjacent the gum line at a point approximately midway between the apex and the crown of the tooth on which the appliance is used. A passive arch wire having a cross-section conforming in shape to the cross-section of the upper crossbar is employed to guide a tooth being shifted while a tooth-shifting force is applied thereto above the gum line so that the tooth is maintained in parallel alignment to the occlusial plane as it is being shifted. A separate arch wire having a cross-sectional shape conforming to the cross-section of the lower crossbar of the bracket may be threaded through the lower crossbars on a patient's anterior teeth to impart orthodontic appliance therapy thereto simultantously as the posterior teeth are being shifted. A sufficiently close tolerance is maintained between a particular arch wire and its associated bracket so that a twist can be imparted to the arch wire by twisting the bracket. Thus, for example, labial torque can be controlled by the action of the arch wire in the lower crossbar of the I-shaped bracket.

The band, bracket, and arch wire combinations can be used equally well for bicuspid extraction cases and nonextraction cases simply by changing the forces applied to the patient's teeth.

By employing both the upper and lower crossbars of the I-shaped bracket in connection with separate and individual arch wires, stresses will be dissipated in the horizontal direction when a patient occludes vertically because the segmental construction of the orthodontic arch does not transfer stresses from one posterior side to the other.

The brackets may be fabricated from a suitable metal for use in connection with metal bands, or the brackets can be extruded from a continuous length of a suitable plastic or other material and severed for use by the orthodontist. The severed brackets can then be readily attached to either a metal band or a band of the present invention by suitable adhesives.

By applying the tooth-shifting force above the gum line, the force is minimized because it is not acting through a lever arm to create a moment. Therefore, a tooth can be shifted faster because the tissue surrounding a tooth does not react against the movement.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which like reference characters refer to like elements in the several views.

In the drawings:

FIGURE 1 is a somewhat schematic view representing the upper and lower arches of a patient with orthodontic appliances of the present invention applied thereto;

FIGURE 2 is a somewhat diagrammatic bottom view of the upper arch shown in FIGURE 1;

FIGURE 3 is a somewhat diagrammatic plan view of the lower arch shown in FIGURE 1;

FIGURE 4 is an exploded, perspective view showing the individual components of an orthodontic bracket of the present invention which may be extruded in individual lengths;

FIGURE 5 is a perspective view of an orthondontal band, bracket, and arch wire of the present invention shown in assembled relation;

FIGURE 6 is a perspective view of a bracket of the present invention after it has been cut from the extruded length of FIGURE 4 and assembled; and FIGURE 7 is a perspective view of a continuous length of tubing of a material suitable for making individual orthodontic bands of the present invention.

Referring again to the drawings, and particularly to FIGURES 4–7, an orthodontic appliance of the present invention, generally designated 10, includes a band 12, a bracket 14, and an arch wire 16.

Individual bands 12 may be severed from a continuous tubular member 18 which, according to a preferred embodiment of the present invention, is extruded from a material which may be supplied in a stretched condition and which shrinks considerably when a shrinkage medium, such as heat, is applied thereto. Individual bands 12 may be severed from the tubular member 18 and placed around the enamelled portion of a patient's tooth, whereupon the shrinkage medium can be applied to the band 12 to cause it to shrink tightly about the tooth and conform to the anatomy thereof. One material which has been found suitable for this purpose comprises an irradiated polyolefin distributed by the Alpha Wire Company, New York, New York, under the name Alpha-Shrink. This is a plastic material which may be supplied in transparent form. It is flame retardent, thermally stable, nontoxic, and is practically invisible when in position on a patient's tooth. A band 12 of this material may be placed around a patient's tooth, such as the tooth 20 shown in FIGURE 2, and caused to conform to the anatomy thereof by the application of heat to the band 12. One means for applying this heat is to heat a dental spatula, not shown, to a temperature somewhat above that which the human hand can comfortably withstand. The spatula may then be applied to the band 12 causing it to shrink. The band aborbs the heat so that it will not be uncomfortable to the tooth 20. The natural warmth of the patient's mouth also helps to shrink the band 12 tightly about the tooth 20 so that the band holds so fastly to the tooth 20 that the band has to be severed to be removed. Being of a plastic material, brackets and other dental appliances that are applied to the band can be made of a nylon or other plastic material. Of course, it is to be understood that successful orthodontic appliance therapy may be accomplished with the orthodontic appliances of the present invention by using conventional metal bands.

The orthodontic brackets 14 may be fabricated from metal for use in connection with metal bands or, alternatively, the brackets 14 can be readily fabricated by the orthodontist from extruded plastic material for use on plastic bands 12. Each bracket 14 comprises a substantially I-shaped member having an upright portion 22, an upper crossbar 24, and a lower crossbar 26.

In acordance with a presently preferred embodiment of the invention, the portions 22, 24, and 26 may be severed from a continuous length of a suitable extruded, rigid plastic material. For example, the upper crossbar portions 24 may be severed from a continuous length of tubular material, such as the tube 28 shown in FIGURE 4. The lower crossbars 26 may also be severed from the tubular member 28, or a separate tubular member 30 may be employed when different cross-sectional shapes are desired. The upright portion 22 may be severed from a continuous tubular member 32 after which a portion of each end is cut away to form a shelf 34 and a back wall 36 to which the associated crossbar portions 24 and 26 are adhesively secured. The crossbar portions 24 and 26 comprise hollow members having a noncylindrical cross-section so that a flat arch wire 16 may be slidably mounted therein while rotation thereof is prevented. It will be readily apparent to those skilled in the art that torquing may not only be controlled in a number of different directions by imparting a suitable twist to the arch wire 16, but the torquing force may be applied at either the exposed portion of the tooth being treated or at a point midway between the crown and apex of the tooth, depending upon whether the upper crossbar portion 24 or the lower crossbar portion 26 is employed to impart the twist to the wire 16. Should the plastic material from which the brackets 14 are made not remain set when twisted to a particular position, the desired twist may be imparted to the wire 16 by employing suitable shims, such as the one shown at 38, to control the amount of tilting, skewing, or the like, of the portions 22, 24, and 26 with respect to each other and with respect to the band 12, as will be readily understood by those skilled in the art. The arch wire 16 preferably is made from a resilient metal of any of the types employed for conventional arch wires.

The availability of both the upper crossbar portion 24 and the lower crossbar portion 26 on each bracket 14 for the reception of a suitable arch wire 16 not only facilitates accurately controlling the magnitude of orthodontic forces, but permits applying them from a number of different directions and locations to simultaneously treat a number of different conditions. Although the brackets 14 may be employed in conjunction with a single arch wire 16 extending from the posterior teeth on one side of a patient's dental arch to the posterior teeth on the other side thereof, separate arch wires 16 preferably are employed in such a manner that stresses will be dissipated in a horizontal direction when the patient occludes vertically, as will be described more fully hereinafter.

Referring now to FIGURES 1–3, the use of the orthodontic appliances of the present invention will be described in connection with particular types of orthodontic appliance therapy for purposes of illustration, but not of limitation.

The upper portion of FIGURE 1 represents a patient's upper dental arch 40 and the lower portion of FIGURE 1 represents the patient's lower dental arch 42. The upper and lower bicuspids, referred to generally by orthodontists as the "fours," have been extracted to provide more room for the remaining teeth. An orthodontic arch of segmental construction, generally designated 44, has been applied to the teeth comprising the dental arch 40. The purpose of the orthodontic arch 44 is to simultaneously move the upper canine teeth 46 into the space vacated by the extracted bicuspids and to uniformly distribute the central incisors 48 and the lateral incisors 50 while torquing them as required. A segment 44a of the dental arch 44 is employed to move each canine tooth 46. Each segment 44a includes a first orthodontic appliance $10_m$ which is affixed to the proximal molars 20 on each side of the dental arch 40 to serve as anchors when a shifting force is applied to the canine teeth 46. A second orthodontic appliance $10_b$ comprising a band 12 and a bracket 14 is affixed to each unextracted bicuspid 54 and a third orthodontic appliance $10_c$ is affixed to each canine tooth 46. An arch wire $16_a$ is then threaded through the upper crossbar portions 24 of the appliances $10_m$, $10_b$, and $10_c$ on each segment 44a. A first hooked end 56 of wire $16_a$ extends beyond its associated appliance $10_m$ and a second hooked end 58 of each wire $16_a$ extends beyond its appliance $10_c$. A rubber band 60 is then hooked behind the first end 56 and drawn forwardly to the second end 58 behind which it is also hooked. Each rubber band 60 applies a force to its associated canine tooth 46 to shift it in the direction of arrow 62 (FIGURE 1) while the associated molars 20 serve as suitable anchors. This force is applied above the gum line 64 in such a manner that each tooth 46 remains in parallel alignment to the occlusial plane while it is being moved laterally in the direction of its associated arrow 62.

The central and lateral incisors 48 and 50, respectively, are also fitted with suitable dental appliances $10_i$ comprising bands 12 and brackets 14. Another length of dental wire $16_b$ is threaded through the lower crossbar portions 26 of the appliances $10_c$ and $10_i$ to form another segmental orthodontic arch 44b. The segmental orthodontic arch 44b may be adjusted in such a manner that limited torquing and the like can be imparted to the canine teeth 46 as they are being shifted by their associated segmental arches 44a. In addition, the incisors 48 and 50 may be torqued in a number of different directions by imparting the proper twists and bends to the wire 16 through the proper positioning of the lower crossbar portions 26 on the associated dental appliances $10_i$.

Segmental orthodontic arches 44c and 44d have been applied to the teeth comprising the lower dental arch 42 in a somewhat different manner. The segments 44c are affixed to the canine teeth 66, the unextracted bicuspids 68, and the proximal molars 70 on both sides of the dental arch 42. Each segment 44c includes the same appliances $10_m$, $10_b$, and $10_c$ which were employed on the upper dental arch 40. An arch wire segment $16_c$ is then threaded through the upper crossbar portions 24 on the teeth 66, 68, and 70 while another arch wire segment $16_d$ is threaded through the lower crossbar portions 26 on only the teeth 68 and 70. Suitable hooks 71 are formed on the ends of the wires $16_c$ and $16_d$ and a rubber band 72 is connected to the hooks 71 on one end of the wires $16_d$. A third segment of arch wire $16_e$ is threaded through the lower crossbar portions 26 on the canine teeth 66, the lateral incisors 78, and the central incisors 76, respectively. A hook 74 is then formed on each end of wire $16_e$ and connected to an associated rubber band 72. The lower crossbar portions 26 can be adjusted so that they coact with the arch wire segment $16_e$ to impart a number of different types of orthodontic forces to the teeth 66, 76, and 78. For example, a labial torque may be imparted to the lateral incisors 78 while the central incisors 76 are torqued lingually. In addition, a predetermined amount of cuspid rotation may be effected.

When the segmental orthodontic arches 44a, 44b, 44c, and 44d are in position as shown, and the patient occludes vertically, stresses will be dissipated in a horizontal direction instead of being transferred from one side to the other of a particular dental arch. It should be noted, however, that the segment 44d applies these torquing forces below the gum line 80 approximately midway between the apices 82 and the crown 84 of the involved teeth.

While the particular orthodontic appliances herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:
1. An orthodontic appliance comprising:
   an orthodontic band made of a heat shrinkable material; and
   an orthodontic bracket rigidly affixed to said band.
2. The orthodontic appliance of claim 1 wherein said heat shrinkable material comprises an irradiated polyolefin.
3. In combination with an orthodontic band, an orthodontic bracket comprising:
   a first hollow, crossbar portion having a non-cylindrical cross section for slidably and nonrotatably receiving a dental arch wire;
   a second hollow, crossbar portion having a non-cylindrical cross section for slidably and nonrotatably receiving a dental arch wire;
   a rigid member connecting said first and second crossbars together; and
   means affixing one of said crossbar portions to said band.

References Cited by the Examiner
UNITED STATES PATENTS

| | | | |
|---|---|---|---|
| 1,044,764 | 11/1912 | Federspiel | 32—14 |
| 1,140,759 | 5/1915 | Montag | 32—14 |
| 2,230,315 | 2/1941 | Winslow | 32—14 |
| 3,022,543 | 2/1962 | Baird et al. | |

ROBERT E. MORGAN, *Acting Primary Examiner.*

RICHARD A. GAUDET, *Examiner.*

J. W. HINEY, JR., *Assistant Examiner.*